Feb. 3, 1970  R. A. TERSELIC ETAL  3,493,711

SPLIT WELDING CHAMBER

Filed June 1, 1967

INVENTORS
RICHARD A. TERSELIC
LOUIS ROSENBLUM

BY

ATTORNEYS

United States Patent Office 3,493,711
Patented Feb. 3, 1970

---

3,493,711
SPLIT WELDING CHAMBER
Richard A. Terselic, Chevy Chase, Md., and Louis Rosenblum, Middleburg Heights, Ohio, assignors to the United States of America as represented by the Administrator of the National Aeronautics and Space Administration
Continuation-in-part of application Ser. No. 364,862, May 4, 1964. This application June 1, 1967, Ser. No. 643,332
Int. Cl. B23k 9/16, 35/38, 9/00
U.S. Cl. 219—72
2 Claims

ABSTRACT OF THE DISCLOSURE

A portable, split welding chamber including a 360° rotating welding head, which chamber may be assembled around the weld area of elongated workpieces, sealing means being provided between the chamber sections and around bores through which the workpieces extend in the assembled chamber.

---

This application is a continuation-in-part of copending application Ser. No. 364,862 filed May 4, 1964, now abandoned.

The invention described herein was made by employees of the United States Government and may be manufactured and used by or for the Government for governmental purposes without the payment of any royalties thereon or therefor.

This invention relates to the material joining art and, more particularly, to electron beam welding.

In electron beam welding fusion is effected by focusing a highly concentrated electron beam on the joint to be welded. Since focusing a concentrated electron beam is all but impossible in a high density gas molecule filled atmosphere, the welding is best performed in a vacuum. This welding technique is well suited to joining materials which are highly reactive with elements of our normal atmosphere at high temperatures since the process is completed in a vacuum.

Prior art devices of this type have consisted basically of a hermetically sealed vacuum chamber, a vacuum pump for evacuating the chamber, and electron beam welding unit mounted within the chamber and openings at either end of the chamber through which the workpieces may be inserted. Although such devices have generally served the purpose, they have not proved entirely satisfactory under all conditions of service because of their limited use. For example, because of the relatively large size and weight of the vacuum chamber employed it has heretofore been the practice to bring the workpieces to the welding apparatus rather than bring the welding apparatus to the workpiece at its location. Prior art devices also proved to be limited in their use in that because of the chamber construction they could not be used for making the final closure weld in a closed tubing or solid rod loop unless the entire loop of tubing was of such a size so that it could entirely be placed within the chamber. More particularly, prior art vacuum chambers for use in welding include a pair of spaced apart openings through which the workpieces were inserted and when the welding operation was completed the welded section had to be removed from one of the two above-mentioned openings.

The general purpose of this invention is to provide for an electron beam welding device which embraces all the advantages of similarly employed prior art devices and possesses none of the aforedescribed disadvantages. To attain this, the present invention contemplates a unique vacuum chamber which is of such a size that it can be moved easily to the workpiece at any location and of such construction that it can be used for making the final closure weld in a tubing or solid rod loop regardless of the length of tubing involved.

Accordingly, it is an object of the present invention to provide a new and improved welding apparatus.

Another object of this invention is to provide a welding apparatus which can be used especially for making the final weld in a closed loop of solid rod or tubing.

Still another object of this invention is to provide for a welding apparatus that can be used for welding workpieces of a wide variety of shapes.

A further object of this invention is to provide a welding apparatus which is portable and light enough to be carried by the user.

Still another object of this invention is to provide a welding apparatus wherein the welding chamber housing can be easily disassembled and the entire workpiece removed therefrom.

It is yet another object of this invention to provide a welding apparatus in which the welding chamber is sectioned and can be assembled around the workpiece at the location of the workpiece.

An additional object of the invention is to provide a welding chamber of the above type in which vacuum tight sealing means are provided between the chamber sections and also between the workpieces and the chamber sections.

Additionally, it is an object of the invention to provide sealing means around the workpieces, which sealing means is configurated to engage and compress resilient sealing members disposed around the workpieces and between the chamber sections in the areas where the workpieces extend through the chamber.

Other objects and features of the invention will become apparent to those skilled in the art as the disclosure is made in the following description of a preferred embodiment of the invention as illustrated in the accompanying sheet of drawing in which.

The apparatus in accordance with this invention generally includes an electron beam welding device enclosed within a vacuum chamber. The welding unit includes a turntable (to which an electron gun is attached) which is rotatable 360°. The vacuum chamber includes a plurality of ports, one for viewing the inside of the chamber, one for the insertion of electrical leads required for the welding unit and one to which the evacuating apparatus may be connected. The chamber itself is comprised of two sections at least one of which is concave and which are joined together and secured by suitable fastening and sealing means to provide for an air tight compartment. In operation the workpiece is inserted between the two sections and the sections then joined together to form a closed chamber. The chamber also includes an opening through which suitable evacuating apparatus may be attached. The vacuum chamber also includes means located within the chamber for aligning the workpieces relative to each other.

Figures 2, 3:
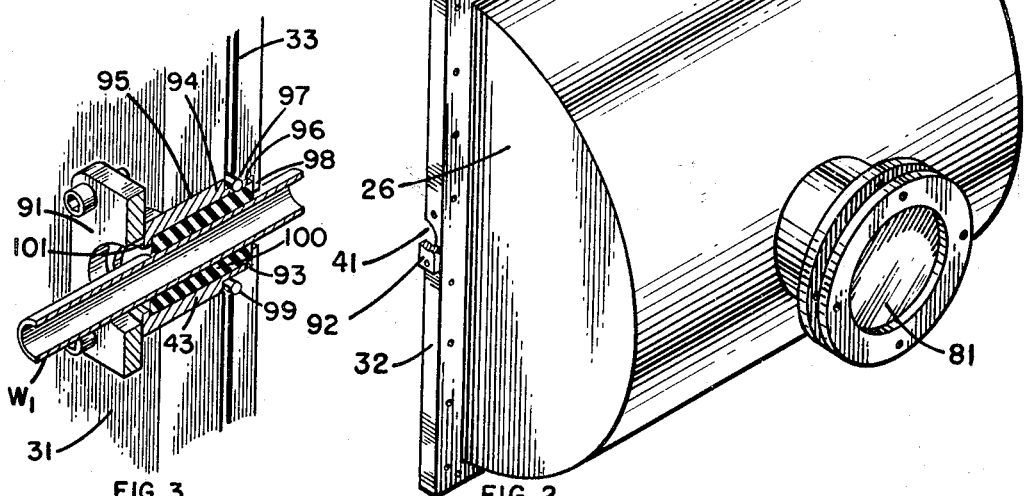
FIG. 2 is an isometric view of the other portion of the apparatus.
FIG. 3 is an enlarged, perspective sectional view of the sealing means utilized at opposite ends of the chamber to permit the workpieces to extend therethrough.

Referring now, more particularly, to the attached drawing the main portion or section includes a generally hollow housing herein referred to as reference number 21. FIG. 2 shows generally the second of the two sections or cover plate section and referred to as reference numeral 22. The two sections when joined together form a closed chamber or compartment. The two sections 21 and 22 can be of any shape which can be joined together to form a closed chamber. It is not necessary that the sections be of the same shape or configuration. As shown in the attached drawings each of the sections is generally one-half of a cylinder which when joined together form a cylindrical housing that is split along a longitudinally diametric plane. Section 21 of the chamber includes a flat semi-circular front 23, a curved sidewall 24 and a flat semi-circular rear end 25 and is open at the top. Section 22 of the chamber includes a flat semicircular front end 26, a curved sidewall 27 and a flat semi-circular rear end which is not shown in the diagram and is also open at the top.

Each of the sections also includes an outwardly extending peripheral flange 31, 32 adjacent to its open top. A longitudinal continuous groove 33 extends around the surface 34 of the peripheral flange 31 said surface contacting the corresponding surface of peripheral flange 32 when the sections are placed in abutting relationship. A similarly located groove is provided for in peripheral flange 32. O-ring cord stock is positioned in the area between the grooves. The peripheral flanges 31, 32 are further provided with a plurality of threaded bores positioned between the longitudinal groove and the outer edge of the flange and are adapted to receive fasteners such as a nut 38 and bolt 39 for securing together the two sections.

Circular bores 41 and 42 are provided for on either end of the chamber in axial alignment with the longitudinal axis of the cylinder. Said bores are adapted to receive bushing members 43 and 44. The workpieces W1 and W2 are mounted within the bushing members 43 and 44. In the cylindrical chamber shown, the bore is formed by a groove located on each of the flanges of the two sections. However, other arrangements are possible, it only being necessary that the recesses or bores into which the bushings are seated are connected by a passageway or have a common surface with at least one of the flanges so that the bronze bushing or other equivalent type of plug means can be removed when the two sections are detached. The bushings together with sealing means to be described presntly form an air tight compartment when the sections are secured together by suitable fastening means.

Mounted on one of the inner walls of the chamber is a base plate 51 rigidly secured thereto by welding or other suitable means. Extending outward from the base plate 51 are a plurality of mounting posts 59, 53, and 54 to which is rigidly secured a mounting plate 55. Rotatably mounted on the plate 55 is turntable 56. The longitudinal axis of turntable 56 (the axis about which the turntable rotates) is in axial alignment with the longitudinal axis of the cylinder. Rigidly secured to the turntable 56 is a welding head or gun 57. Turntable 56 has a section 63 that is removable so that the workpiece can be inserted or withdrawn. Base plate 51 and mounting plate 55 are provided with radial slots 61 and 62 respectively which are in radial alignment with each other and directed outward toward the open top. Slidably mounted on a clamping post 71, which is rigidly secured to the chamber, are a plurality of adjustable clamps 72, 73, and 74 which are adapted to be clamped on to the workpieces to align the workpieces W1 and W2 relative to each other. The turntable 56 is connected by a drive assembly 52 connected to means 68 external to the chamber for rotating the turntable 360°.

The chamber is also provided with a port 81 for viewing the inside of the chamber, a port 82 for inserting the electrical wiring for the welding head and a port 83 to which the evacuating apparatus may be connected. The evacuating apparatus is of the type well known in the art which includes a vacuum pump and tubing. Rectangular bushing retaining members 91 and 92 having a semi-circular slot are secured to each flange as shown to provide for additional sealing means. A similar pair of members are secured to the other end of the chamber.

Figure 1:
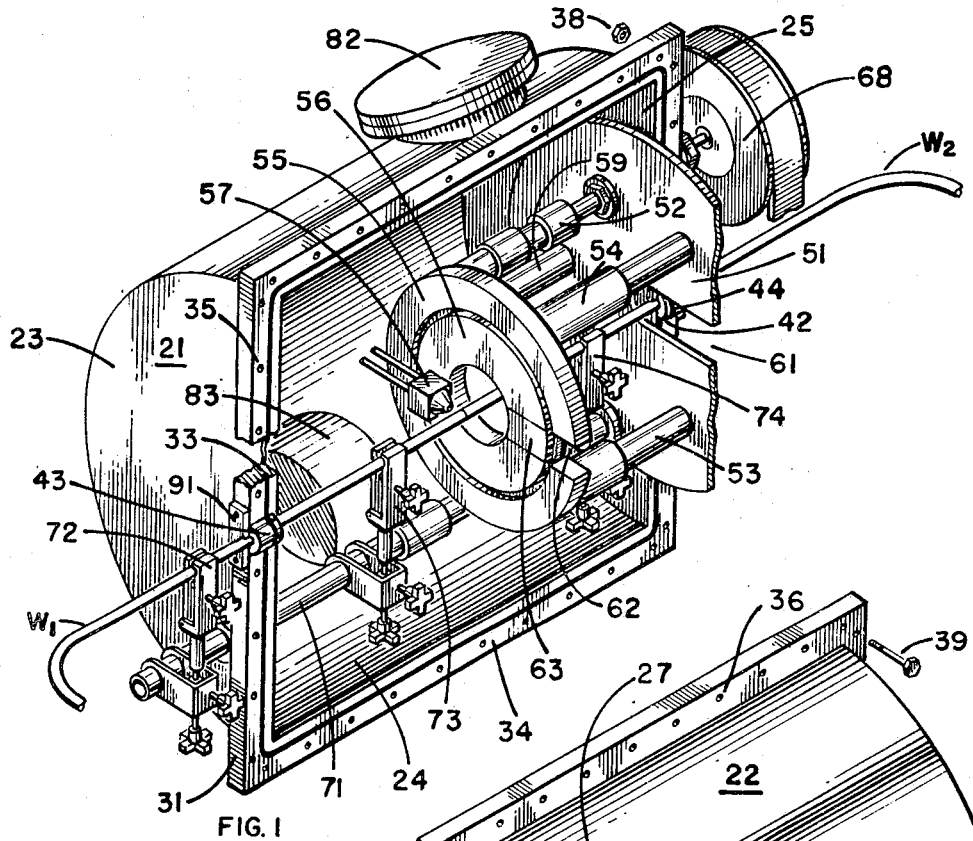
FIG. 1 is an isometric view of one of the two portions of the apparatus.

Referring to FIG. 3, there is shown a detailed, perspective, sectional view of the bushing 43 and its associated sealing members. Parts in FIG. 3 corresponding to those in FIG. 1 are identified by like numerals.

As shown in FIG. 3, the bushing 43 is provided with an extension 93. The extension 93 has a substantially smaller exterior diameter than the bushing 43 thereby forming an annular bushing shoulder 94.

In order to accommodate the bushing 43 and its extension 93, the bore 41 has a first diameter 95 over the portion of its length between the exterior surface of the flange 31 and the groove 33. The bore 41 has a substantially smaller diameter 96 over the remainder of its length resulting in an annular bore shoulder 97. The bore 41 terminates at its inner end at an annular chamber flange 98 which seals the space between the workpiece W1 and the bushing 43, as will be explained presently.

A resilient O-ring 99 is placed on the extension 93 before the bushing 43 is placed in the bore 41 of the flange 31. As a result, when the bushing retaining member 91 is tightened, the O-ring 99 is compressed between the bushing shoulder 94 and the bore shoulder 97.

Advantageously, this compression causes the O-ring to expand radially outward to contact the O-ring cord stock disposed in the groove 33. Thus, the O-ring not only provides a seal betwen the exterior of the bushing 43 and the flange 31 but also seals the junctures of the groove 33 and the bore 41. With the bushing 43 in place, the bushing shoulder 94 and the base shoulder 97 define an annular, flat-sided passageway lying in a plane perpendicular to the longitudinal axis of the chamber and coinciding with the groove 33.

In order that a vacuum-tight seal will be established between the bushing 43 and the workpiece W1, a cylindrical resilient member 100 is disposed therebetween. The desired seal is effected by compressing the resilient member longitudinally whereby it expands radially outward against the interior of the bushing 43 and radially inward against the exterior of the workpiece W1.

To this end, a radially inward directed flange 101 is provided around the outer end of the busing 43. With this arrangement, the resilient sealing member 100 is longitudinally compressed between the flange 101 of the bushing 43 and the annular flange 98 formed by the chamber sections 21 and 22 at the inner erd of the bore 41.

If desired, the resilient sealing member 100 may be eliminated in certain instances. The space between the workpiece and the bushing may then be filled with a packing material to effect the vacuum-tight seal. However, the configurations of the bore 41 and the bushing 43 as described above would not be altered.

A bushing 44 is provided in the bore 42 at the opposite end of the welding chamber from the bushing 43. These bushings 43, 44 are identical as are the bores 41 and 42. Accordingly, the bushing 44 and the bore 42 will not be described.

The apparatus is used as follows. The bushings or bronze plugs 43 and 44 are inserted onto the two sections of tubing or solid rod that are to be welded. The workpiece is then placed within the chamber section 21 with the plugs 43 and 44 properly sealed in the recesses 41 and 42. Slidably mounted clamps 72, 73, and 74 are positioned and clamped to the tubing sections W1 and W2 so that said sections will be in alignment with each other. The O-ring stock is seated in the longitudinal groove and the other section 22 of the chamber is placed in a butting relationship with section 21 thereby forming a closed compartment. The two sections are secured together by means of the fastening means forming thereby an airtight chamber. The chamber is then evacuated and the welding operation performed. Once the welding has been completed section 22 is removed, turntable 56 rotated so that the removable section 63 is once again in alignment with slot 61 and 62. Section 63 is then removed and the welded section lifted out therefrom. The plugs or bronze bushing members 43 and 44 are then cut away or otherwise removed from the completely welded workpiece.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. In an apparatus for welding a plurality of elongated workpieces in an airtight enclosure, in combination:

a hollow housing having an access opening through which a plurality of workpieces may be inserted and at least one workpiece opening through which one of the workpieces extends, said housing including an outwardly extending peripheral flange adjacent to said access opening;

a cover plate adapted to be placed over said access opening to form a closed chamber;

said cover plate including an outwardly extending peripheral flange which fits against the flange on the housing in abutting relationship when the cover is placed over the access opening, each of said peripheral flanges including a longitudinally extending groove;

means for securing said cover plate to said housing;

first sealing means comprising resilient cord stock disposed in the longitudinally extending grooves between the abutting surfaces of the peripheral flanges, said resilient cord stock terminating at diametrically opposite points in said workpiece opening;

second sealing means comprising a bushing disposed around the workpiece at said workpiece opening, a first shoulder on said bushing, a second shoulder in said housing around said workpiece opening, a ring of resilient material disposed between said first and second shoulders, means for urging said bushing toward the interior of the housing whereby said ring of resilient material is compressed to seal the exterior of said bushing in said workpiece opening, a hollow cylinder of resilient material disposed around said workpiece between the same and said bushing;

means for compressing said hollow cylinder of resilient material comprising a first radially inwardly extending flange disposed at the outer end of said bushing and a second radially inwardly extending flange disposed in said workpiece opening at the inner surface of said housing; and the first and second shoulders defining an annular passage, said annular passage coinciding with the terminations of the longitudinally extending grooves at diametrically opposite points in the workpiece opening whereby as the ring of resilient material is compressed between the first and second shoulders it expands radially outwardly to sealingly engage the ends of the resilient cord stock disposed in said longitudinally extending grooves of the peripheral flanges.

2. The apparatus of claim 1 in which the grooved surface of the access opening peripheral flange lies in a plane passing through the center of the bushing whereby the housing and the cover plate form a split chamber.

References Cited

UNITED STATES PATENTS

| | | | |
|---|---|---|---|
| 2,126,366 | 8/1938 | Boyer | 277—105 |
| 2,567,479 | 9/1951 | Hebard | 277—105 |
| 3,013,826 | 12/1961 | Sharp | 277—105 |
| 3,035,147 | 5/1962 | Latter | 219—60.1 |
| 3,113,999 | 12/1963 | Heikkinen | 277—125 |
| 3,135,855 | 6/1964 | Barber | 219—72 |
| 3,179,781 | 4/1965 | Ross et al. | 219—60.1 |
| 3,192,301 | 6/1965 | Sterzl. | |
| 3,194,936 | 7/1965 | Rohrberg et al. | 219—60.1 |
| 3,264,004 | 8/1966 | Sciaky. | |
| 3,351,350 | 11/1967 | Shepler | 277—105 |

JOSEPH V. TRUHE, Primary Examiner

W. DEXTER BROOKS, Assistant Examiner

U.S. Cl. X.R.

219—121